United States Patent
Lüchinger et al.

(10) Patent No.: US 8,393,361 B2
(45) Date of Patent: Mar. 12, 2013

(54) RECEPTACLE FOR WEIGHING PRESCRIBED TARGET QUANTITIES OF SUBSTANCES

(75) Inventors: Paul Lüchinger, Uster (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 13/045,583

(22) Filed: Mar. 11, 2011

(65) Prior Publication Data

US 2011/0192491 A1  Aug. 11, 2011

Related U.S. Application Data

(63) Continuation of application No. PCT/EP2009/060635, filed on Aug. 17, 2009.

(30) Foreign Application Priority Data

Sep. 11, 2008 (EP) ..................................... 08164177

(51) Int. Cl.
*B65B 1/04* (2006.01)
*B65B 3/04* (2006.01)

(52) U.S. Cl. .............. 141/83; 141/5; 141/332; 141/335; 141/338; 141/344

(58) Field of Classification Search ................. 141/5, 83, 141/329–332, 335, 337–338, 344
See application file for complete search history.

(56) References Cited

U.S. PATENT DOCUMENTS

| | | | | |
|---|---|---|---|---|
| 64,752 A * | 5/1867 | Dickenson | ................... | 141/335 |
| 160,017 A * | 2/1875 | Hoagland | ................... | 141/335 |
| 285,168 A * | 9/1883 | Schussler, Jr. et al. | ....... | 141/335 |
| 340,646 A * | 4/1886 | Westgate | ...................... | 141/292 |
| 530,690 A * | 12/1894 | James | ........................... | 141/335 |
| 748,988 A * | 1/1904 | Schaper | ...................... | 141/292 |
| 761,702 A * | 6/1904 | Paradis | ........................ | 141/55 |
| 2,767,744 A * | 10/1956 | Beerman | ..................... | 141/319 |
| 2,868,246 A * | 1/1959 | Nelson | ......................... | 141/286 |
| 4,077,551 A * | 3/1978 | Manaresi | ..................... | 222/494 |
| 5,004,024 A * | 4/1991 | Rezmer et al. | ................ | 141/298 |
| 5,950,697 A * | 9/1999 | Hobbs | .......................... | 141/344 |
| 6,341,631 B1* | 1/2002 | Hobbs | .......................... | 141/344 |
| 6,603,081 B2* | 8/2003 | Luchinger | .................... | 177/126 |
| 7,237,582 B1* | 7/2007 | Harvey | ......................... | 141/330 |
| 7,614,429 B2 | 11/2009 | Pluvinage | | |
| 7,855,343 B2 | 12/2010 | Nakagawa et al. | | |
| 2007/0006942 A1* | 1/2007 | Pluvinage et al. | .............. | 141/83 |
| 2007/0290012 A1* | 12/2007 | Jackman | .................... | 222/541.4 |
| 2008/0173668 A1 | 7/2008 | Bloechlinger | | |

FOREIGN PATENT DOCUMENTS

DE   19841478 A1   3/1999

* cited by examiner

*Primary Examiner* — Gregory Huson
*Assistant Examiner* — Nicolas A Arnett
(74) *Attorney, Agent, or Firm* — Standley Law Group LLP

(57) ABSTRACT

A receptacle for the weighing-in of free-flowing substances has a fill opening, a tubular-shaped circumference wall, and a bottom part. The bottom part is connected to the tubular-shaped circumference wall, which it tightly closes off in the direction of gravity when the weighing receptacle is in its operating position. The weighing receptacle can be set on the weighing pan of a balance and can be filled like a beaker with free-flowing substances without allowing the latter to escape therefrom. The bottom part can be opened either by an outside force acting on the weighing receptacle and/or through the influence of a solvent acting on the weighing receptacle, forming an outlet orifice in the bottom part. The weighing receptacle, otherwise tightly sealed in the direction of gravity, can be flushed out with a fluid when the outlet orifice is opened.

14 Claims, 6 Drawing Sheets

FIG. 1B   FIG. 1C   FIG. 1D

RECEPTACLE FOR WEIGHING PRESCRIBED TARGET QUANTITIES OF SUBSTANCES

CROSS-REFERENCE TO RELATED APPLICATIONS

This application is a continuation of, and is entitled to benefit of a right of priority under 35 USC §120 from PCT/EP2009/060635, filed 17 Aug. 2009, which is in turn entitled to the benefit if a right of priority under 35 USC 119 from European application 08164177.1, filed 11 Sep. 2008. The content of each of these applications is incorporated by reference as if fully recited herein.

TECHNICAL FIELD

The disclosed embodiments relate to a weighing receptacle for preparing prescribed quantities of substances, a process which is also referred to as "weighing-in".

BACKGROUND

Receptacles used for weighing-in, such as laboratory containers, bottles, beakers, shallow dishes, flasks, test tubes and the like belong to the known state of the art. They serve for example as target containers in dosage-dispensing processes where prescribed quantities of substances, for example in the form of powders or pastes, are dispensed manually. Subsequently, the substances which are in powder- or paste form are dissolved in the weighing receptacle by adding a solvent and are for example analyzed in an HPLC (high-performance liquid chromatography) apparatus. HPLC instruments are based on a relative method of measurement and therefore need to be calibrated with a known standard solution before the actual analysis of an unknown substance is performed. In this process it is particularly important to know the exact concentration of the standard solution, as the measurement uncertainty of the result of the analysis cannot be better than the uncertainty of the stated composition or concentration of the standard solution that is being used. Solutions are normally prepared with a mix ratio of 1:1000 to 1:10,000, and the concentration is stated in milligram per liter. Typically, the substance is weighed in as accurately as possible in a calibrated weighing receptacle, i.e. a receptacle whose volume is defined by a calibration mark. Next, the receptacle is filled with solvent up to the calibration mark.

Given that substances in powder- or paste form are in most cases measured out manually, and since the minimum amount of substance that can be dispensed manually limited by natural factors such as, e.g., a steady hand of the person that does the dispensing, the shape of the spatula, the adhesive and cohesive properties of the substance particles and the like, a relatively large quantity of the solution, for example 100 ml, will have to be prepared in order to meet the precision required of the mix ratio. On the other hand, only an amount of, e.g., 2 ml of the prepared solution is used for the HPLC analysis, while the large leftover quantity will have to be safely disposed of.

A weighing receptacle used for preparing a solution accordingly has large dimensions, as the substance is preferably dispensed into the same receptacle in which the solution is prepared by adding the solvent.

In gravimetric measuring instrument with a high resolution of the weighing result, i.e. instruments used to weigh quantities in the milligram- or microgram range, the maximum load or maximum weight that can be set on the load receiver is not the only quantity that is subject to physical limitations. The size of the weighing receptacle likewise has a considerable influence on the weighing result. The problem stems in particular from the fact that even minimal differences in temperature will cause changes in air buoyancy of the weighing receptacle. For example, with a temperature rise of 0.1° C. the material of a 100 ml glass flask will expand to an extent that a 40 microgram deviation can be observed as a result of the increased air volume displaced by the flask. The manufacturing tolerances of weighing receptacles of this kind in regard to their weight (tare weight) and their behavior under temperature fluctuations make it impossible to find a practical way of compensating for the effects of air buoyancy. It is therefore hardly feasible to achieve a high level of precision in dispensing very small substance quantities into large weighing receptacles.

As the manufacturing costs and the costs for the safe disposal of waste materials are rising, the aim in the preparation of solutions is to reduce their quantities as much as possible. It would therefore suggest itself to use balances with a higher measurement resolution in order to be able to weigh even smaller substance quantities with a higher degree of precision, so as to achieve the same mix ratio with smaller amounts of substance. However, as explained above, the size of the weighing receptacle limits the feasibility of this approach. A possible starting point for solving the buoyancy problem is therefore the idea of reducing the weighing receptacle.

In a rudimentary form, this concept is being practiced in laboratories in that the substance is not dispensed directly into a large and heavy weighing container, but is measured out first into a lightweight weighing receptacle such as for example a weighing boat or a weighing paper. Next, the weighing paper is rolled into a funnel. This funnel or the weighing boat is then set into the opening of a container and the substance is flushed into the container with a solvent. However, this procedure has several drawbacks and risks.

The biggest drawbacks are in the achievable degree of precision and in the danger of contamination by substances that are hazardous to human health and to the environment. In the subsequent rolling of the paper and also when the paper or weighing boat holding the substance is transferred from the weighing pan to the container, it can happen that substance gets spilled. Furthermore, the work area and its occupant can be contaminated by health-endangering substances, if the latter include for example volatile microscopic particles. When the paper or weighing boat is rinsed with the solvent, particles can remain stuck to the surface, particularly in places that were not wetted by the liquid at all or only insufficiently, so that the solution will differ from the prescribed concentration. One should also not disregard the risk that the substance could become contaminated during the transfer by impurities in the ambient air.

It is therefore an object to provide a weighing receptacle for the weighing-in of substances, wherein the receptacle itself is of minimal material volume and weight and its design ensures safe and user-friendly handling during the operations that follow the weighing.

SUMMARY

This and other objectives are met with a weighing receptacle that has a fill opening, a tubular-shaped circumference wall, and a bottom part. The bottom part is connected to the tubular-shaped circumference wall and tightly closes off the latter in the direction of gravity, when the weighing receptacle is set up in its operating position. A weighing receptacle of this design can be set on the weighing pan of a balance and can be filled like a beaker with free-flowing substances without allowing the latter to escape from the weighing receptacle.

The bottom part can be opened either by an outside force acting on the weighing receptacle and/or through the influence of a solvent acting on the weighing receptacle, so that as a result an outlet orifice is formed in the bottom part. The weighing receptacle, which is otherwise tightly sealed in the direction of gravity, can be flushed out with a fluid when the outlet orifice is in its open state.

In referring to "an outside force acting on the weighing receptacle", the intended meaning is that the outlet orifice is opened by the action of a force alone rather than by any implement that is separate from the weighing receptacle such as for example a hollow needle, a blade, a drill and the like. Thus, the opening of the orifice occurs as an indirect result of a force acting at a specific location of the weighing receptacle and giving rise to a reactive counterforce at another location of the weighing receptacle. Consequently, the weighing receptacle is being partially deformed by the action of the force alone, whereby an outlet orifice is formed. This is of the highest importance, as the various implements mentioned above could be at least partially wetted and consequently contaminated by the solution in the course of opening the outlet orifice. The contaminated implement would then have to be put through an expensive cleaning procedure or else would have to be safely disposed of. In contrast, the specific location of the weighing receptacle for the application of the force and the other locations for taking up the reactive counterforces that occur as a result are never wetted by solvent liquids.

The term "flushing out" carries the meaning that a liquid or a gas is introduced through the fill opening and that the for example pulverous substance that is present in the weighing receptacle is flushed out of the weighing receptacle through the outlet orifice by means of the fluid. Of course, as soon as the outlet orifice is opened, parts of the substance can fall under their own gravity through the outlet orifice into another container. It should be emphasized that the flush-out capability is a central feature of the disclosed weighing receptacle. This is the only possible way to ensure that the substance can be completely flushed out of the weighing receptacle into a receiving container. If the substance were dissolved already in the weighing receptacle with a solvent and then for example poured over into a larger container, a small part of the solution, and thus a small part of the substance, would remain as a surface-wetting layer in the weighing receptacle. If the solution were subsequently thinned down in the container, the resultant concentration would be incorrect, because the calculation of the concentration would still be based on the originally weighed-in quantity of substance. Furthermore, this procedure would be strongly dependent on the dissolving power of the solvent and therefore, due to the small available volume of the weighing receptacle, it would be usable only in a limited number of cases.

Of course, one could also fill several weighing receptacles in sequence, then set them one after the other on the receiving container and flush them out. The receiving container could be for example a calibrated volumetric flask. After the weighing receptacle has been removed, the flask can be topped off with more solvent up to the calibration mark of, if necessary.

Preferably, the force that is acting from the outside can be generated by setting the weighing receptacle onto an inlet opening of the receiving container. This means that, similar to a lock-and-key concept, the outlet orifice is opened only when the weighing receptacle is seated onto a suitably shaped structure. This prevents an unintended opening of the outlet orifice. Suitable structures can be for example the neck of a bottle, the rim of a beaker, a tubular neck, the opening of a test tube and the like. The bottom part is preferably configured in such a way that the outlet orifice extends far into the interior space of the receiving container or at least into the inlet opening of the latter. The purpose of this is to protect the inlet area, for example a ground glass neck of a receiving container, against contamination.

Design configurations are also conceivable in which the outside force can be generated by rotating the weighing receptacle or a part of the weighing receptacle relative to the inlet of the receiving container.

The bottom part can further include a closure body which can be removed by the force acting from the outside and/or dissolved by the solvent. One could also consider a very thin adhesive joint to be a closure body, after whose dissolution for example a seam in the bottom part would pop open on its own or could be spread open under a small force.

If desired, the outlet orifice, or the combination of an outlet orifice with a closure body, could be designed in such a way that after the outlet orifice has been opened once, it cannot be closed again. Of course, the outlet orifice can also be designed so that it can be closed again. As a simple way to achieve this, it is advantageous if the bottom part is at least to some extent made of a material with rubber-elastic properties which can be deformed under a load and returns to its original shape after the load has been removed.

In a further embodiment of the weighing receptacle, the outlet orifice is designed with a line of intentional breakage where a slit-shaped rupture will take place when a lateral force is applied. With the design concept of a line of intentional breakage, the weighing receptacle is liquid- and gastight except for the fill opening. Locations of intentional breakage are normally formed by arranging areas of reduced thickness in the material. When the material is subjected to a mechanical force, it will be overstressed in the areas where the material thickness is reduced, and as a result a targeted rupture or breakage of the material will occur at these locations.

Even if the location of intentional breakage cannot be closed gas-tight again after it has been broken open, it is still possible to retain a degree of liquid-tightness in the outlet orifice which under a lateral force opens up to a variable width and also closes itself to a variable degree when the force is reduced. By removing the force, the passage of the fluid can thus be slowed down or even stopped.

The weighing receptacle can further have suitable means to generate not only the laterally acting force, but also shear forces and ripping forces. These means can be constituted by a specifically designed shape, for example an elliptic cross-sectional profile of the circumference wall, and also by features that are formed on the wall such as wedge-shaped wall sections, direction-changing levers, projections, cutting edges and the like. Such means do not necessarily have to be integrally connected to the weighing receptacle. A suitably configured sleeve which is movable in a straight line and/or rotatable in relation to the circumference wall can likewise serve to produce laterally acting forces, shear forces and ripping forces.

A further embodiment of the weighing receptacle can include a retainer catch which keeps the outlet orifice irreversibly in the open state. This has the advantage that a weighing receptacle which has been used once cannot be used again. This forces the operator to use a new and positively clean weighing receptacle for the next weighing-in process. Especially when substances of high reactivity are involved, even the slightest inadvertently caused intermixing of two substances can have devastating consequences.

The closure body mentioned above can be configured in different ways. The simplest solution consists of a sphere which is pressed into the outlet orifice and which can be pushed out of the outlet orifice in the direction of gravity through suitable means, for example with a collar around the circumference. The closure body will in this case fall into the receiving container.

Preferably, the chemical and physical properties of the weighing receptacle and, if applicable, of the closure body are known, for example their exact weight and volume, their magnetic susceptibility, chemical stability and the like, and if they are known, they are preferably marked on the weighing receptacle or even stored in an electronic storage medium (RFID tag) which is arranged on the weighing receptacle. Thus, when preparing a solution it is possible for example to take the weight and/or the volume of the closure body into account for the amount of solvent to be added. Furthermore, it can be verified automatically whether the weighing receptacle placed on the balance is allowed to be used together with the intended solvent. In the case of soluble or disintegrating closure bodies, the material properties of the closure body will of course also need to be known. The soluble closure body does not necessarily have to be made of an inert solid material. It can also contribute properties to the solution that are useful in the process steps that follow after the flushing-out. Thus, the material used in the closure body can be for example an inhibitor, a catalyst or an indicator; it can have hydrophilic properties or can cause a precipitation in the solution. In the case of disintegrating closure bodies, the closure plug only breaks apart into small fragments or powder, neither of which is soluble in the solvent medium. Depending on its properties, the material of the soluble closure body may upon contact with the solvent convert entirely into a gaseous phase and escape without subsequently being part of the solution.

In an ideal case, the closure body can assist in the dissolution process. When the receiving container is shaken, even a sphere can help to create enough turbulence in the solvent to significantly reduce the time needed for dissolving the substance. Even better results are obtained if the closure body constitutes for example a magnetic stirrer bar of a magnetic stirrer device.

It is also conceivable that substances are dispensed which contain some contamination. To allow the proportion of contaminants to be determined through a differential measurement, it can be of advantage if the contaminants remain in the weighing receptacle. If the contaminating substances are not soluble in the solvent that being used, they can be held back in the weighing receptacle by means of a screen, a membrane or a filter insert, which are arranged in the area of the outlet orifice. By using static mixer elements, the process of dissolution could possibly be completed already with the flushing-out.

To prevent as much as possible that any substance particles will remain stuck in the weighing receptacle, the insides of the tubular-shaped circumference wall, of the bottom part and of the outlet orifice which face towards the substance have a very smooth and/or coated surface. Surface coatings known from the field of nanotechnology can for example exhibit the so-called lotus effect which causes the solvent to contract into beads and run off, pulling along absolutely all powder particles. The inside surfaces are preferably dark-colored, so that retained substance particles, which are normally of a light color, will be more visible.

To ensure that it is firmly positioned on the weighing pan, the weighing receptacle has at least one support pedestal. Furthermore, with a suitable design of the support pedestal, an unintended opening of the outlet orifice can be even better prevented. The preference is therefore in particular for a tubular-shaped support pedestal which sufficiently covers up the defined location where the force for opening the outlet orifice has to be applied, so that this location is accessible only from a specifically defined access direction. It is also conceivable that the internal contour profile of the tubular-shaped support pedestal is matched only to a very specific receiving container, so that the outlet orifice can only be opened if the right kind of container is present.

It is possible that after a substance dose has been dispensed the further processing, i.e. the flushing-out of the substance from the weighing receptacle, does not take place immediately. It can therefore be of advantage to have a closure lid which seals the fill opening of the weighing receptacle and which can be opened and reclosed. This closure lid is preferably connected to the weighing receptacle, but this is not absolutely required. The closure lid can further have a connector for the injection of a fluid such as a gas or solvent into the interior of the receptacle, so that substances can also be flushed out or blown out of the weighing receptacle under high pressure.

As has already been described above, the weighing receptacle can include an electronic information-storage medium and/or a machine-readable identification field. The machine-readable identification field can contain information in text form, or also a bar code or matrix code. As is illustrated by the following description of a method to prepare a solution with a dosage-dispensing device, a balance, a receiving container and a weighing receptacle, the information in the storage medium or identification field not necessarily limited to data concerning the weighing receptacle.

Essentially, this method has the following steps:

In a first step, a new and unused weighing receptacle is placed on the weighing pan of the balance.

In a second step, the balance is tared.

In a third step, a prescribed quantity of a free-flowing substance is dispensed by means of the dosage-dispensing device through the fill opening into the weighing receptacle.

In an intermediate step, if the weighing receptacle carries an electronic storage medium, data concerning the substance and, if applicable, concerning the weighing receptacle and the dispensing process are stored in the electronic storage medium of the weighing receptacle and/or written into the identification field of the weighing receptacle. The data concerning the substance, such as its exact chemical composition and structure, its manufacturing date, hazard warnings, notes regarding the solvent, the storage of the substance and the like can be stored for example in the dosage-dispensing device, in a database, or in a storage memory that is arranged on the supply container or a dosage-dispensing unit from which the substance was taken. Data concerning the dispensing process can include for example the date, the exact time of day, the tare weight of the weighing receptacle, information regarding the ambient atmosphere such as room temperature and humidity, as well as information regarding the person performing the process.

In a fourth step, the weighing receptacle is removed from the weighing pan and set on the inlet opening of a receiving container, with the bottom part of the weighing receptacle reaching far inside the receiving container.

In a fifth step, the outlet orifice is opened by the action of a force, for example by a force applied vertically to the circumference wall or the support pedestal, or it is opened by introducing a fluid and thereby dissolving the soluble closure body.

In a sixth step the weighing receptacle is flushed out by injecting a fluid, so that the entire substance quantity is flushed out of the weighing receptacle into the receiving container. Subsequently, the amount of fluid filled into the receiving container can be determined gravimetrically or volumetrically, or the receiving container can be topped off with additional fluid, in particular solvent liquid, up to a specific mark.

In a further step, if the weighing receptacle carries an electronic storage medium, the data that have been stored in the electronic storage medium and/or written into the identification field of the weighing receptacle are saved in an electronic storage medium that is arranged on the receiving container and/or are transferred to an identification field of the receiving container. This procedure ensures an uninterrupted trail of traceability and documentation of the preparation process of the solution.

BRIEF DESCRIPTION OF THE DRAWINGS

The various embodiments of the weighing receptacle will hereinafter be explained in further detail through examples and with references to the drawings, wherein

FIGS. 1B through 1D are all top cross-section views taken along line X-X in FIG. 1A, FIG. 1B showing the outlet orifice or line of intentional breakage in the closed state, FIG. 1C showing the outlet orifice in the open state, and FIG. 1D showing a case where the line of intentional breakage or the outlet orifice is arranged at an angle α relative to the largest cross-sectional diameter and is shown in the closed state;

DETAILED DESCRIPTION

Figure 1A:
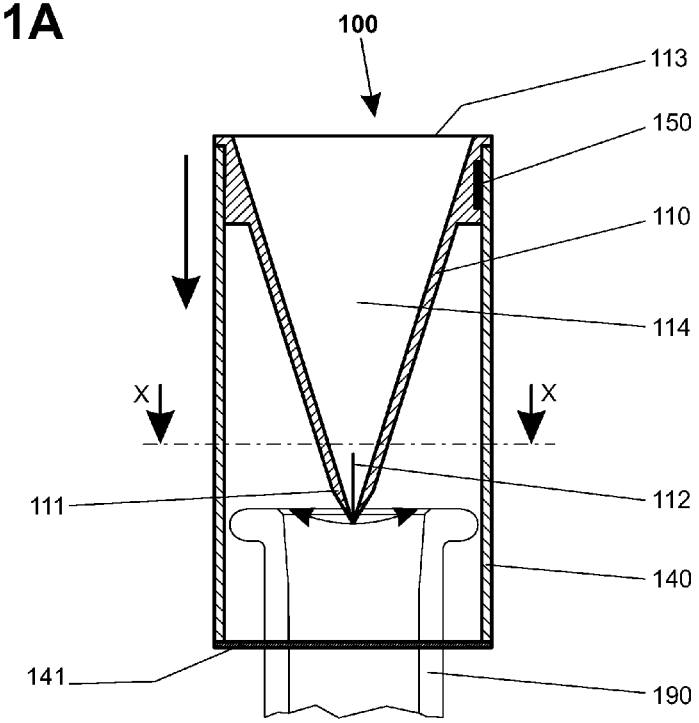
FIG. 1A is a side sectional view of a first embodiment of a weighing receptacle with a slit-shaped outlet orifice or line of intentional breakage which opens itself when the weighing receptacle is set onto a receiving container.
Figure 1A:
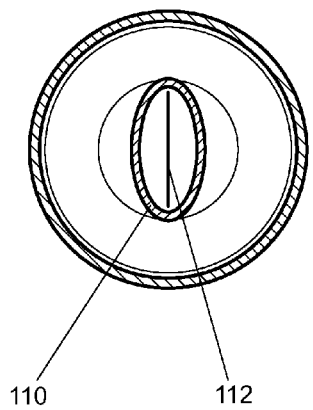
Figure 1A:
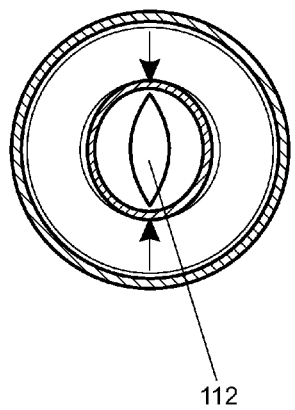
Figure 1A:
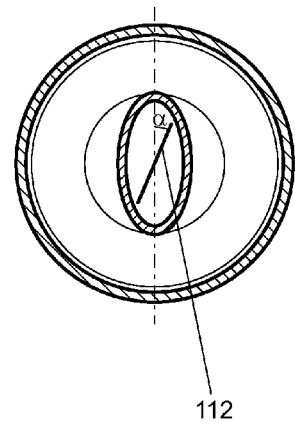

The weighing receptacle 100 in a first embodiment, shown in its operating position in FIG. 1A, has a tubular-shaped circumference wall 110 and a bottom part 111 which, in the operating position of the weighing receptacle 100, closes off the tubular-shaped circumference wall 110 in the direction of gravity, i.e. in the downward direction. In the opposite, i.e. upward direction, the interior space 114 which is delimited by the tubular-shaped circumference wall 110 and the bottom part 111 is open and freely accessible. The upper end of the tubular-shaped circumference wall 110 thus forms the fill opening 113. The interior space 114 is funnel-shaped, so that substance residues clinging to the internal surface of the tubular-shaped circumference wall 110 will be more visible and thus easier to flush out of the tubular-shaped circumference wall 110. The interior space 114 is preferably kept in a dark color, so that any substance particles remaining stuck will be more visible as they are normally of a light color.

To ensure that it is firmly standing on a weighing pan (not shown in the drawing), the weighing receptacle 100 has a support pedestal 140 which is connected to the tubular-shaped circumference wall 110 in the vicinity of the inlet opening 113. With the tubular-shaped configuration of the support pedestal 140, it is further possible to prevent damage to and contamination of the bottom part 111. This protection can even be improved if the remaining opening of the support pedestal 140 is closed with a destructible cover foil 141, for example of aluminum. When the weighing receptacle 100 is set on a receiving container 190 (drawn in thin lines in FIG. 1A), the cover foil 141 is destroyed.

The bottom part 111 further has an outlet orifice 112 which in its unstressed condition has the form of a slit. The slit-shaped outlet orifice 112 of a new weighing receptacle 100 can be glued shut, or it can also be designed as a thinned-down area of intentional breakage. By applying a lateral force, the outlet orifice 112 can be opened or the area of intentional breakage, if applicable, can be caused to rupture. As a precondition for this spreading or rupturing of the outlet orifice 112 to take place, the tubular-shaped circumference wall 110 needs to have an appropriate shape. Preferably, the tubular-shaped wall 110 is given the shape of a funnel as shown in FIG. 1A.

Furthermore, the tubular-shaped wall 110, over at least a part of its funnel-tapered height, has a cross-sectional profile of elliptical shape as shown in the cross-section X-X in FIG. 1B. As the larger diameter of the elliptical profile is arranged in the same vertical plane as the slit-shaped outlet orifice 112, the aforementioned laterally directed force can be generated in the act of setting the weighing receptacle 100 onto a receiving container, whereby the outlet orifice 112 is opened as shown in FIG. 1C. Of course, other suitable configurations of the tubular-shaped circumference wall 110 are also possible, for example with a rectangular, square or rhombic cross-sectional profile.

If additional shear force components need to be generated in order to cause the rupturing of the area of intentional breakage, the direction of the slit of the opening 112 needs to be oriented at an angle α relative to the largest diameter of the elliptical profile, as depicted in FIG. 10. Depending on the material of which the bottom part 111 is made, the outlet orifice 112 can either return to the closed state (if the material is elastically resilient) or remain open (if the material is subject to plastic deformation) when the weighing receptacle 100 is removed from the receiving container.

Furthermore, the weighing receptacle 100 preferably carries an electronic storage medium 150, for example an RFID tag, in which a serial number is stored as an unmistakable identifier. This has many benefits. Specifically, it provides a link whereby a weighing receptacle 100 can be traced at any time to a work operation that was performed with it. For the safe disposal of a weighing receptacle 100, it is for example possible to establish what substances the weighing receptacle could be contaminated with. Further, this electronic storage medium 150 could also be used to store the chemical and physical properties of the weighing receptacle 100, so that prior to using the latter for a specific application, it can be verified whether the material of the weighing receptacle 100 is compatible with the substance or with the solvent. In addition, the electronic storage medium 150 could hold information such as the usage date, the material properties of the substance, the weighed mass of the substance dispensed into the receptacle, the solvent to be used, information regarding the further process steps, as well as safety data, for example information regarding the person using the receptacle, classification data, hazard warnings and the like. Based on these data, further equipment can be controlled or preconfigured. It is conceivable for example that a solvent pump 703 (see FIG. 7) is operable only if the data stored in the electronic storage medium 150 have been examined in a processor unit 709 and have been found to meet the conditions for operating the solvent pump 703.

Figure 2A:
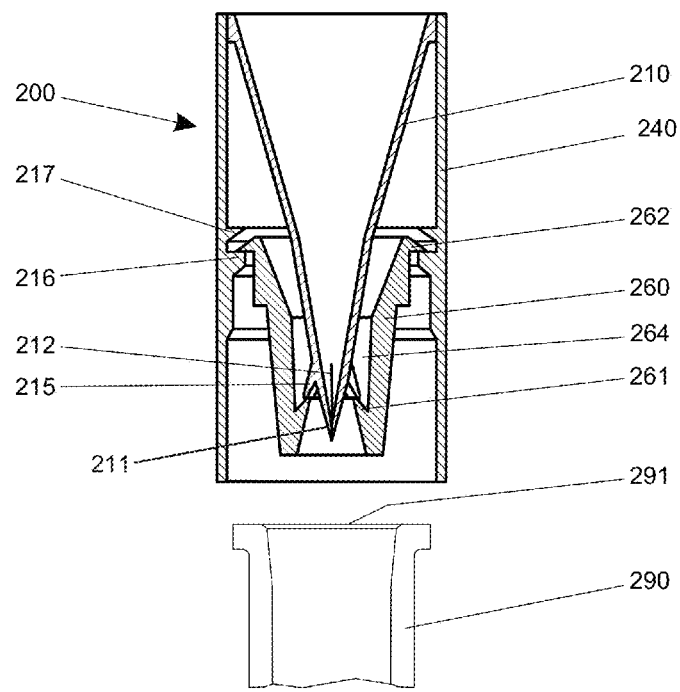
FIGS. 2A and 2B are side sectional views of a second embodiment of the weighing receptacle, FIG. 2A showing the embodiment in the closed state and not seated on a receiving container, with a sleeve which is designed so that when the weighing receptacle is set on a receiving container, the sleeve moves in a linear direction and, as a result, rips open the bottom part at an intended location and frees up the outlet orifice, and FIG. 2B showing the second embodiment seated on a receiving container and in the open state.

FIG. 2A illustrates a second embodiment of a weighing receptacle 200 as seen from the side in a cross-sectional view, with an outlet orifice 212 which opens itself when the weighing receptacle 200 is set onto a receiving container 290. In contrast to the preceding embodiment, the outlet orifice 212 of the weighing receptacle 200 is not opened primarily by the action of a lateral force. Rather, the outlet orifice 212 is forced apart by means of an opener sleeve 260 through a form-fitting engagement.

The tubular-shaped circumference wall 210 is of an essentially similar design as the circumference wall of the first embodiment, except for several opener lugs 215 which are arranged in a star-shaped pattern around the bottom part 211 on the outside of the tubular-shaped circumference wall 210. In the illustrated example, the tubular-shaped circumference wall 210 is connected to a support pedestal 240, but the two parts can also be integrally joined to each other in one piece. A ring-shaped support ledge 216 and a catch ring 217 are formed on the inside of the support pedestal 240.

The aforementioned opener sleeve 260 is seated loosely inside the support pedestal 240, with the bottom part 211 reaching into the inside passageway 264 of the sleeve. A rubber-elastic snap detent ring 262 which is formed on the opener sleeve 260 is engaged with the support ledge 212, so that in the operating position of the weighing receptacle 200 the opener sleeve 260 is held captive inside the support pedestal 240 and cannot fall out.

Figure 2B:
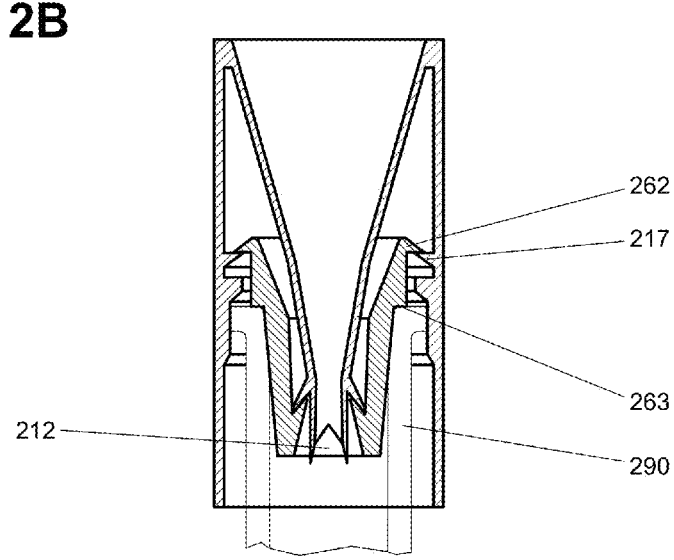

Further, a gripper ring 261 in the shape of a hollow truncated cone is formed inside the passageway 264 of the sleeve. With a linear movement of the opener sleeve 260 relative to the tubular-shaped circumference wall 210 in the direction against gravity, the gripper ring 261 engages the opener lugs 215. With continued movement, due to the contour profile of the gripper ring 261 in the shape of a hollow truncated cone, the opener lugs 215 are pulled apart horizontally in a star-shaped radial pattern from the central longitudinal axis of the tubular-shaped circumference wall 210 until the outlet orifice 212 breaks open. This state is illustrated in FIG. 2B. As is further evident from FIG. 2B, the snap detent ring 262 is now engaged by the catch ring 217. The purpose of this is to permanently prevent the outlet orifice 212 from closing itself again. Once a weighing receptacle 200 has been used, it can therefore be readily distinguished from an unused weighing receptacle.

To prevent the inside of the opening 291 of the receiving container 290 from getting contaminated, the outside contour of the opener sleeve 260 is shaped so that the opener sleeve 260 reaches far into the opening 291. When the weighing receptacle 200 is set onto a receiving container 290, the weighing receptacle 200 is resting against the receiving container 290 by means of a ring-shaped shoulder 263 that is formed on the opener sleeve 260.

Figure 3:
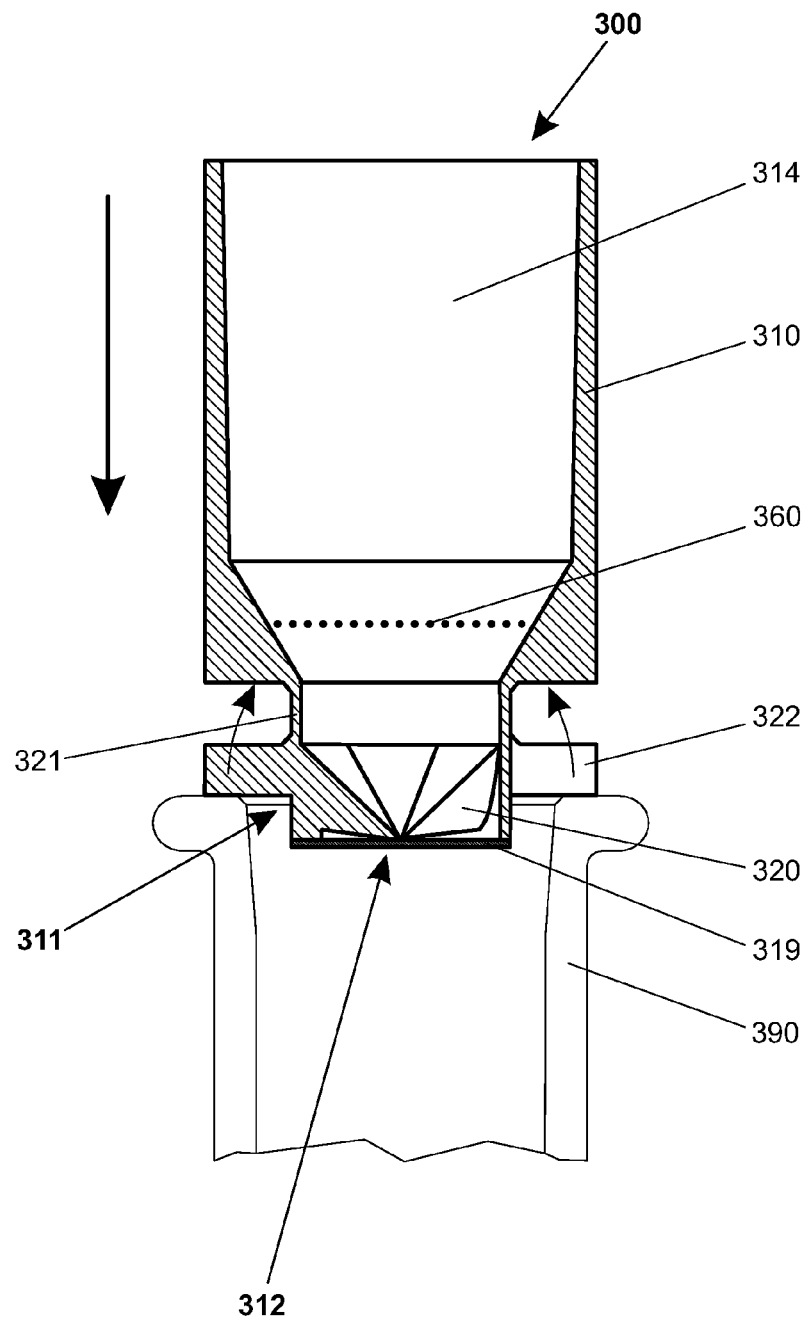
FIG. 3 is a side sectional view of a third embodiment of the weighing receptacle with an outlet orifice that opens itself when the weighing receptacle is set on a receiving container.

FIG. 3 illustrates a third embodiment of a weighing receptacle 300 as seen from the side in a cross-sectional view, with an outlet orifice 312 which opens itself when the weighing receptacle 300 is set onto a receiving container 390. In contrast to the preceding embodiments, the outlet orifice 312 of the weighing receptacle 300 is tightly sealed by a membrane 319. The bottom part 311 of the tubular-shaped circumference wall 310 includes several ripping elements 320 that serve to break open the membrane 319. Each of the ripping elements 320 is hinged on the tubular-shaped circumference wall 310 by way of a flexure pivot 321. To move the ripping elements 320, i.e. to pivot them downwards, each ripping element 320 is mechanically coupled to a lever arm 322. When the weighing receptacle 300 is set on a receiving container 390, the ripping elements 320 are put into action, whereby the membrane 319 is torn open or ruptured, as soon as the lever arms 322 rests against the rim of the receiving container.

Arranged in the interior space 314 of the weighing receptacle 300 is a screen insert 360 which holds back for example larger substance particles or substances of a pasty consistency, so that during the flushing-out phase they can be optimally attacked by the solvent. This can significantly shorten the dissolving time needed in the subsequent process phase of dissolving the substances in the receiving container 390. Of course the screening sieve 360 could be permanently connected to the tubular-shaped circumference wall 310, but it could also be designed as an insert which can be set in place as well as taken out. Instead of the screen insert 360, there could also be static mixing elements, filter inserts and the like arranged in the interior space 314.

Figure 4:
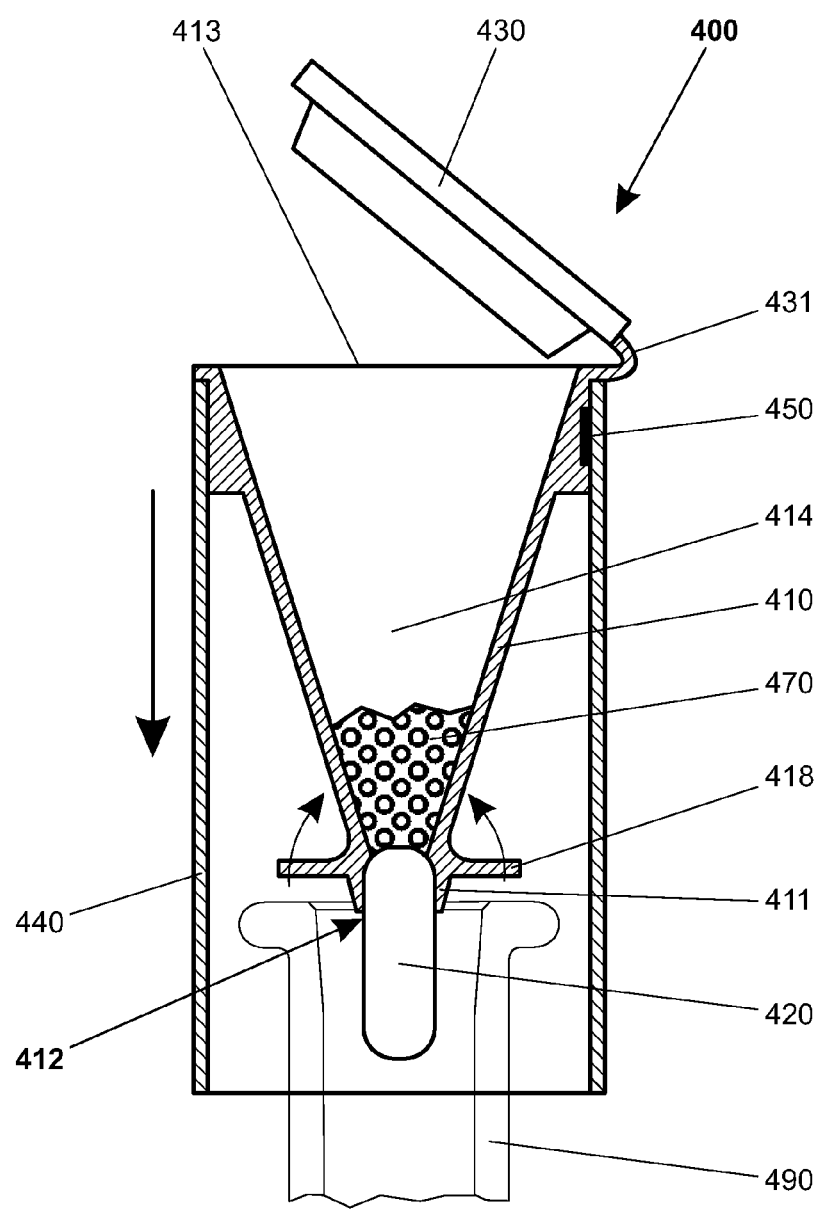
FIG. 4 is a side sectional view of a fourth embodiment of a weighing receptacle with a closure body which releases itself from the outlet orifice when the weighing receptacle is set on a receiving container.

FIG. 4 illustrates a fourth embodiment of a weighing receptacle 400 as seen from the side in a cross-sectional view. The weighing receptacle 400 again has a tubular-shaped circumference wall 410 and a bottom part 411 which enclose an interior space 414. In this embodiment, the outlet orifice 412 which is arranged in the bottom part 411 is tightly sealed by a closure body 420. The closure body 420 is in this case a magnetic bar of a magnetic stirrer device. The chemical and physical properties of the closure body 420 are preferably known, for example its exact weight and volume, its susceptibility, chemical stability and the like, and are noted on the weighing receptacle 400, if possible, or even stored in an electronic storage medium 450 (RFID tag) which is arranged on the weighing receptacle 400. Thus, when preparing a solution it is possible for example to take the weight and/or the volume of the closure body 420 into account for the amount of solvent to be added.

The bottom part 411 is made of an elastic material and has a ring-shaped collar 418 around its circumference. If the collar is arranged in a suitable way near the end of the closure body, as shown in FIG. 4, the outlet orifice 412 is stretched open when the collar 418 is turned up in the direction indicated by the arrows, and the closure body 420 falls out of the outlet orifice 412. The turning-up of the collar occurs when the weighing receptacle 400 is set onto the receiving container 490, which is drawn with thin lines.

It is not unusual after an amount of substance 470 has been dispensed into the interior space 414 that the processing of the substance is not continued immediately. The weighing receptacle 400 can therefore have a closure lid 430 as shown in FIG.

4 covering the fill opening 413, which can be opened and closed up again. As illustrated, this closure lid 430 is preferably connected to the weighing receptacle 400 by means of a hinge 431. As described already in the context of FIGS. 1 and 2, this weighing receptacle 400 likewise has a support pedestal 440.

Figure 5:
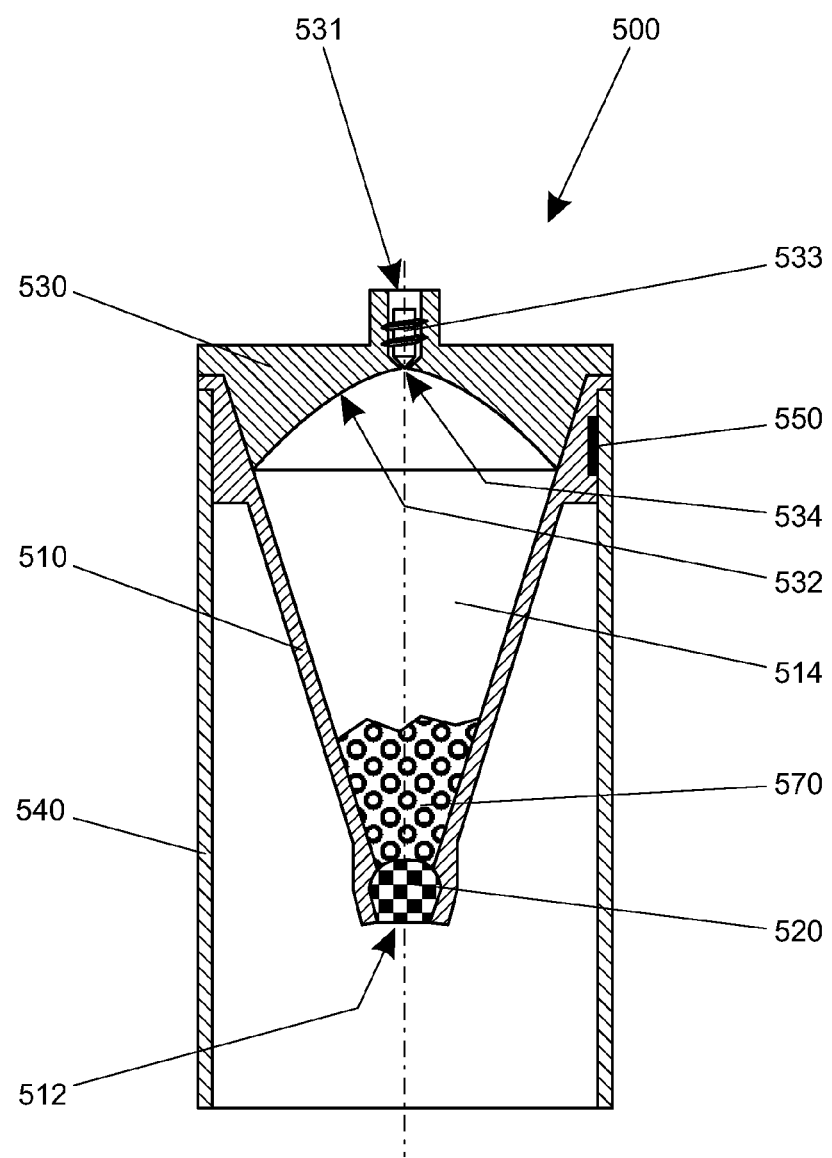
FIG. 5 is a side sectional view of a fifth embodiment of a weighing receptacle with a closure body which dissolves itself when solvents are added to the weighing receptacle.

Of course, a closure body can also consist of a material which is soluble by a solvent. In FIG. 5 a fifth embodiment of a weighing receptacle 500 is shown with a closure body 520 of this kind. The measured dose of substance 570 is only held in the weighing receptacle 500 until a solvent dissolves the closure body 520. The latter can be made to dissolve for example by immersing the outlet orifice 512 which is plugged up with the closure body 520 into a receiving container (not shown in FIG. 5) partially filled with solvent. As soon as the closure body 520 has been dissolved, the substance 570 will also partially dissolve itself and fall into the receiving container. Of course, it is also possible to put solvent into the interior space 514, whereby the closure body 520 can be dissolved from the direction of the interior space 514.

FIG. 5 shows a further embodiment of a closure lid 530. The latter has a bell-shaped internal surface contour 532 and a connector 531. By way of the connector 531, a solvent can be delivered to a nozzle 534 which is formed in the closure lid 530. To enable the nozzle 534 to produce a sufficiently vigorous shower of spray mist in the interior space 514 in order to totally cover the bell-contoured internal surface, the nozzle 534 has a nozzle insert 533 which serves to impart a rotation to the incoming stream of solvent. Of course, the connector can be outfitted with additional armatures, for example with valves that allow the inflow of solvent to be controlled and regulated.

The closure lid 530 can be connected to the tubular-shaped circumference wall 510 or to the support pedestal 540 of the weighing receptacle 500 like a plug-in component, but also through a snap connection or a screw-threaded connection. In this embodiment, too, the chemical and physical properties of the closure body 520 are preferably known, for example its exact weight and volume, chemical composition and the like, and are noted on the weighing receptacle 500, if possible, or even stored in an electronic storage medium 550 (RFID tag) which is arranged on the weighing receptacle 500. Thus, when preparing a solution it is possible for example to take the weight and/or the volume of the closure body 520 into account and also to choose the appropriate solvent.

Figure 6:
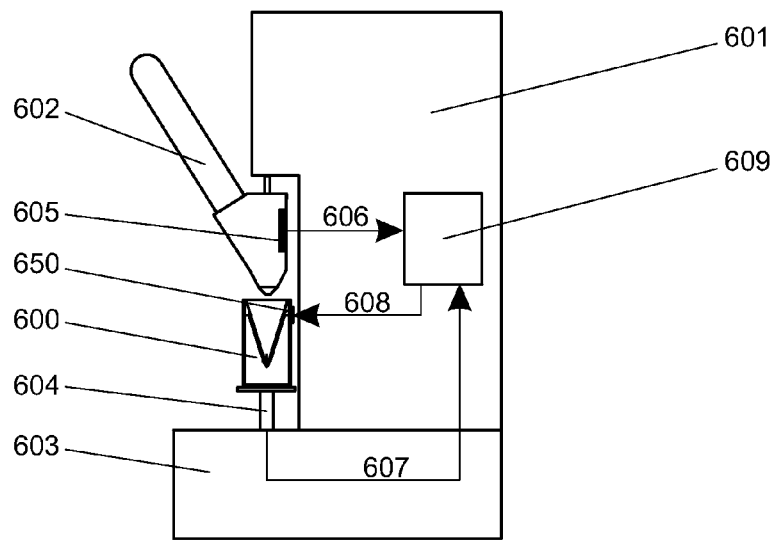
FIG. 6 schematically illustrates a data transfer taking place between an electronic storage medium of a dosage-dispensing device with attached dispensing unit and balance and the electronic storage medium of a weighing receptacle which is set on the weighing pan of the balance.

FIG. 6 schematically illustrates a dosage-dispensing device 601 with an exchangeable dosage unit 602 and with a balance 603. A weighing receptacle 600 is set on the weighing pan 604 of the balance 603. The dosage unit 602 carries an electronic storage medium 605, for example an RFID tag or a storage chip which can be accessed through connector leads. The dosage-dispensing device 601 includes a read/write device, in this case a receiver/emitter unit, through which the information transfer can be carried out. The elements used for the information transfer are known state-of-the-art technology and are represented schematically in FIG. 6 as signal paths 606, 607, 608 and processor unit 609. The arrow directions on the signal paths 606, 607, 608 indicate the destinations to which the data and information are being transferred. It is also evident in this arrangement that additional data such as for example the weight of the dispensed substance as measured by the balance 603 and the tare weight of the weighing receptacle 600 can be transferred to the electronic storage medium 650 of the weighing receptacle 600.

As an alternative possibility, the dosage unit 602 can also carry a machine-readable identification field. The machine-readable identification field can contain information in text form, or also a bar code or a matrix code. Accordingly, the dosage dispensing device 601 needs to include an optical reader device in order to allow a transfer of information. If the information is to be transferred, in turn, into an identification field arranged on the weighing receptacle 600, a printer device will also be needed.

Figure 7:
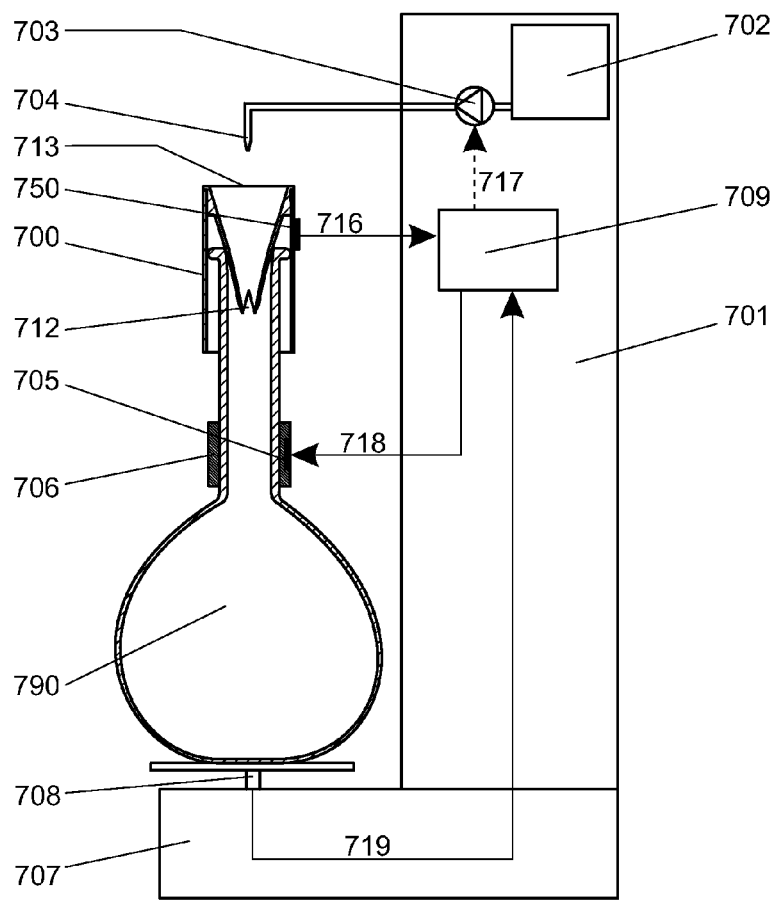
FIG. 7 schematically illustrates a data transfer taking place between the electronic storage medium of the FIG. 6 weighing receptacle and an electronic storage medium of a receiving container.

The flushing-out of a weighing receptacle 700 filled with substance, which follows after the dispensing process, is performed preferably with a flushing device 701 as shown schematically in FIG. 7. If the flushing device 701 includes a balance 707 with a weighing pan 708, as shown in the drawing, the tare weight of a receiving container 790 can be determined in a first step. Next, the filled weighing receptacle 700 is plugged onto the receiving container 790, whereby the outlet orifice 712 is opened up. Depending on the balance 707, this step can or cannot be performed on the weighing pan 708. The open outlet orifice already allows a large part of the substance to fall into the receiving container 790.

The flushing device 701 includes a solvent reservoir 702, a solvent pump 703, and an outlet nozzle 704, the latter directed at the fill opening 713 of the weighing receptacle 700. As soon as the solvent pump 703 has been activated, solvent is moved from the solvent reservoir 702 to the outlet nozzle 704, and the weighing receptacle 700 is flushed out with the solvent, so that no substance remains in the weighing receptacle 700.

The data acquired from the electronic storage medium 750 of the weighing receptacle 700 by way of the signal path 716 are processed in the processor unit 709. If the data included a work instruction, for example the amount of solvent to be added, this information is passed on in the form of control signals through the signal path 717 to the solvent pump 703. The solvent quantity being added can also be determined by means of the balance 707, whose weighing signal is transmitted to the processor unit 709 by way of a signal path 719. Based on the data obtained, the exact concentration of the solution can be calculated. Of course, the weighing signal can also be used to control the solvent pump 717.

It is further conceivable that the solvent pump 703 is only operable after the data stored in the electronic storage medium 750 have been checked in the processor unit 709 and have been found compatible with the safe operation of the solvent pump 703. If this is an issue of concern, the flushing device 701 may have a plurality of solvent reservoirs and solvent pumps, so that based on the information retrieved from the electronic storage medium 750 the correct solvent pump 703 can be selected and activated.

To ensure that the information is also physically tied to the prepared solution, the receiving container 790 can carry a collar band 706 which includes its own electronic storage unit 705. By way of the signal path 718, all relevant information can now be transferred to this electronic storage unit 705.

Of course, the information- and data transfer according to the foregoing description can also be carried out with optical reader devices, identification fields and printers.

Although the invention has been described through the presentation of specific examples of embodiments, numerous further variant solutions could obviously be created based on knowledge gained from the present invention, for example by combining the features of the individual embodiments with each other and/or by interchanging individual functional units of the exemplary embodiments. Thus, it is considered self-evident that each of the weighing receptacles described in FIGS. 1 to 5 can be used in the devices that were described schematically in FIGS. 6 and 7. Further designs that embody the subject of the invention are conceivable in particular if, e.g., the ripping elements of FIG. 3 are connected to each other through locations of intentional breakage, so that a membrane becomes redundant. Of course, all embodiments can have a closure lid to close up the fill opening. Each closure lid can further have a connector to deliver a fluid such as a gas or a solvent into the interior space, so that substances can also be flushed out of the weighing receptacle under high pressure.

What is claimed is:

1. A receptacle for the weighing-in of a free-flowing substance in relation to a receiving container having an inlet opening, comprising:
a tubular-shaped circumference wall;
a fill opening at one end of the tubular-shaped circumference wall;
a bottom part, at an opposite end of the tubular-shaped circumference wall, the bottom part tightly closing off a second end of the tubular-shaped circumference wall in the direction of gravity until an outlet orifice thereof is opened by an outside force acting on the outlet orifice, which is configured as a slit, the outlet orifice allowing the weighing receptacle to be flushed out with a solvent after being opened; and
a support pedestal, surrounding the tubular-shaped circumference wall and extending axially from the fill opening at least as far as the outlet orifice.

2. The receptacle of claim 1, wherein:
the outlet orifice is opened by setting the weighing receptacle onto the inlet opening of the receiving container.

3. The receptacle of claim 2, further comprising:
a catch element, arranged to retain the outlet orifice irreversibly in the open state after the weighing receptacle has been set onto the receiving container.

4. The receptacle of claim 1, wherein:
the bottom part comprises a rubber-elastic material.

5. The receptacle of claim 1, further comprising:
a closure body in the bottom part, the closure body adapted for being opened to provide the outlet orifice.

6. The receptacle of claim 5, wherein:
the closure body comprises a magnetic bar, adapted for use with a magnetic stirrer.

7. The receptacle of claim 1, further comprising
a means for producing a force that is at least one of: laterally acting, shear and ripping.

8. The receptacle of claim 1, wherein:
arranged in the area of the outlet orifice is at least one of: a screening sieve, a membrane, static mixer elements, and a filter insert.

9. The receptacle of claim 1, wherein:
a smooth and/or coated surface is provided on the interior of the tubular-shaped circumference wall, the interior of the bottom part and the interior of the outlet orifice which face towards the substance.

10. The receptacle of claim 1, further comprising:
a lid associated with the fill opening, for opening and reclosing thereof.

11. The receptacle of claim 10, further comprising:
an inlet connector of the closure lid for fluids.

12. The receptacle of claim 1, further comprising:
a medium for storing items of electronic information, at least one of which comprises a machine-readable identification field.

13. A method for preparing a solution of a free-flowing substance in a receiving container with a dosage-dispensing device and a balance, comprising the steps of:
placing, on a weighing pan of the balance, a weighing receptacle comprising:
a tubular-shaped circumference wall;
a fill opening at one end of the tubular-shaped circumference wall; and
a bottom part, connected to the tubular-shaped circumference wall, the bottom part initially tightly closing off a second end of the tubular-shaped circumference wall in the direction of gravity until an outlet orifice is opened therein;
dispensing, from the dosage-dispensing device into the weighing receptacle, a prescribed quantity of the substance, the quantity of substance dispensed determined using the balance;
seating the weighing receptacle on an inlet opening of the receiving container, opening the outlet orifice of the seated weighing receptacle, allowing the dispensed substance contained therein to flow into the receiving container, the opening step achieved by either:
imposing a force on the weighing receptacle; or
introducing a fluid that dissolves a soluble closure body of the weighing receptacle, and
flushing any dispensed substance remaining in the weighing receptacle into the receiving container, using a fluid as the flushing medium.

14. The method of claim 13, further comprising the steps of:
storing information that is related to the dispensed substance and information related to the dosage preparation process, by recording the information to at least one of: an electronic storage medium of the weighing receptacle and an identification field of the weighing receptacle, and
storing the information recorded to the weighing receptacle by recording the information to at least one of: an electronic storage medium of the receiving container and an identification field of the receiving container.

* * * * *

UNITED STATES PATENT AND TRADEMARK OFFICE
CERTIFICATE OF CORRECTION

PATENT NO. : 8,393,361 B2  
APPLICATION NO. : 13/045583  
DATED : March 12, 2013  
INVENTOR(S) : Lüchinger et al.

Page 1 of 1

It is certified that error appears in the above-identified patent and that said Letters Patent is hereby corrected as shown below:

In the Specification

In column 8, line 56, please delete "FIG. 10" and insert -- FIG. 1D --.

Signed and Sealed this
Twenty-second Day of October, 2013

Teresa Stanek Rea
*Deputy Director of the United States Patent and Trademark Office*